L. F. REEDER AND W. B. JACKSON.
BOLL WEEVIL DEVICE.
APPLICATION FILED SEPT. 18, 1919.

1,363,998.

Patented Dec. 28, 1920.

Leonard F. Reeder
Walter B. Jackson
INVENTORS

BY John M. Spellman
ATTORNEYS.

UNITED STATES PATENT OFFICE.

LEONARD F. REEDER AND WALTER B. JACKSON, OF McKINNEY, TEXAS.

BOLL-WEEVIL DEVICE.

1,363,998.  Specification of Letters Patent.  Patented Dec. 28, 1920.

Application filed September 18, 1919. Serial No. 324,513.

*To all whom it may concern:*

Be it known that we, LEONARD F. REEDER and WALTER B. JACKSON, citizens of the United States, residing at McKinney, in the county of Collin and State of Texas, have invented certain new and useful Improvements in Boll-Weevil Devices, of which the following is a specification.

Our invention relates to improvements in devices for collecting and exterminating boll worms, weevils and other parasitic insects and in such connection it relates to the arrangement and construction of such a device.

The principal object of our invention is to provide a device which will effectively remove the boll worms, weevils, &c., from the growing cotton plant and deposit them into a suitable receptacle containing a liquid such as kerosene which kills the worms.

Another object is to provide a device of this character which is so constructed that while gathering the insects it will not injure the cotton plant by breaking off the bolls, &c., the device being simply constructed and not expensive to manufacture.

Our invention will be more fully understood from the following description, taken in connection with the accompanying drawings forming part hereof in which—

Figure 1:
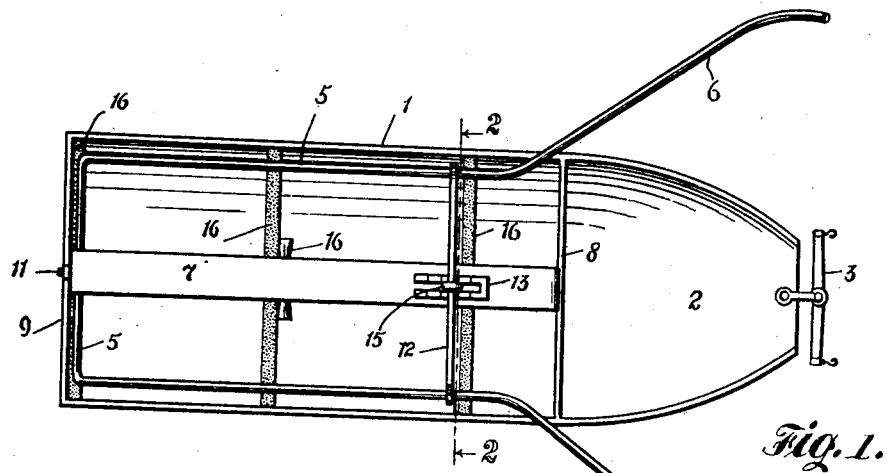
Figure 1 is a top or plan view of a boll weevil device embodying our invention.
Figure 2:
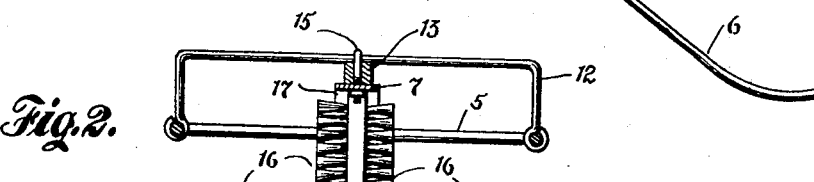
Fig. 2 is a cross sectional view taken on line 2—2 of Fig. 1.

Referring to the drawings, the device has a body 1 constructed preferably of metal, although it may be made of wood, the front end 2 of which is curved inward and a swingletree 3 attached thereto. The bottom of the device is convex and engages the ground at the point 4, hence there is little friction as it is dragged along the ground.

Figure 3:
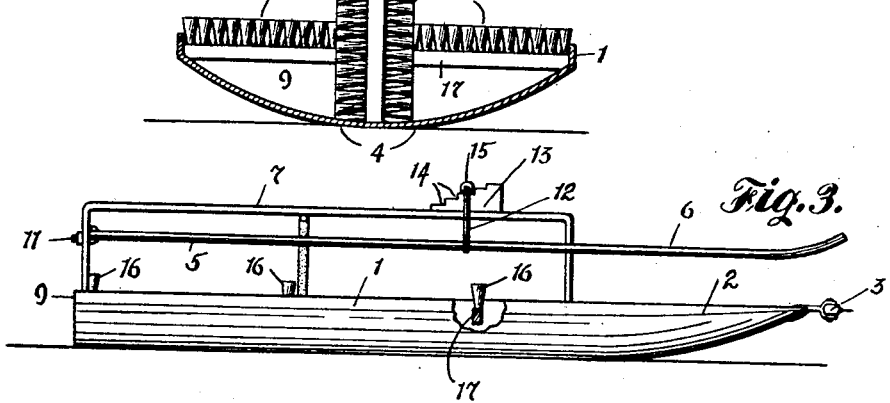
Fig. 3 is a side elevational view with part broken away.
Figures 4, 6:
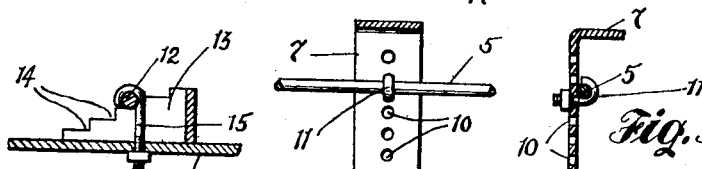
Figs. 4, 5 and 6 are sectional detail views, respectively, illustrating the means of securing and adjusting the collecting arms and rod.
Figure 5:
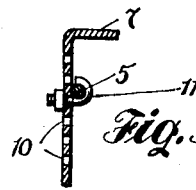

Just above the body 1 is arranged a rod or railing 5, which is bent or curved outward at each of its ends forming arms 6—6. Over the center of the body 1 is a support 7 bent downward at each end as shown in Fig. 3 and rigidly fastened at the front to a cross piece 8 and at the rear to the back end 9 of the body 1. The rear part of the rod 5 is detachably connected to the support 7, see Figs. 4 and 5, the support 7 having a plurality of holes 10—10 to receive a small hook-bolt 11. About midway of the body 1 of the device is a cross rod 12 connected at each end to the rod 5 and constituting a support for the forward end of the rod 5 and the arms 6—6, the cotton plants being caught by the two arms and bent downward so as to pass between the rod 5 and the top of the body 1. A slidable block 13 notched as indicated at 14 is arranged at the center of the cross rod 12. This block is U-shaped and a hook-bolt 15 is placed between the parallel sides thereof, the lower end of the hook-bolt 15 traversing the support 7. Thus by placing the cross rod 12 in the desired notch in block 13, tightening the forward hook-bolt 15 and inserting the rear hook bolt 11 into one of the holes 10—10 the desired height of the rod 5 and arms 6 may be attained, such height being necessary according to the growth of the cotton. We do not limit ourselves to this means of fastening or adjusting the rod and arms as any suitable means may be employed.

Inside the concave body 1 we have arranged a plurality of relatively stiff brushes 16. These brushes may be affixed to the body 1 in any suitable manner, preferably by fastening the metal or wooden portion 17 of the brush to the sides of the body, and affixing the ends of the upright brushes to the support 7 and the concave bottom of the device.

In operation the device is drawn slowly by horse or other power through the cotton field. The cotton plants are caught by the arms 6—6 and brought in toward the body 1 and pressed against the brushes 16, the boll worms and other parasites falling into the concave receptacle of the device which contains a sufficient quantity of kerosene or other liquid which kills the insects. The device may be manufactured of wood if desired, and a metallic receptacle placed therein to contain the destroying liquid.

Having thus described the nature and objects of our invention, what we claim as new and desire to secure by Letters Patent is—

1. A device for catching boll worms, etc., having an oblong, concave body portion with an arcuate bottom, vertical and horizontally disposed brushes attached to said body portion, an adjustable rod carried by the body and substantially paralleling the rim thereof, and means for adjusting and securing said rod to proper height above said rim of the body.

2. A device for catching boll worms, etc., having an oblong, concave body portion with an arcuate bottom, vertical and horizontally disposed brushes attached to said body portion, an adjustable rod carried by the body and substantially paralleling the rim thereof, the forward ends of said rod bent outward at an oblique angle with respect to their parallel relationship to said rim, the extreme ends of said rod curved slightly inward and adapted to engage a cotton plant and cause same to travel between the rod and the rim of said body and against said brushes.

3. A device for exterminating boll worms and other parasitic insects, having an oblong body portion with an arcuate bottom, vertical and horizontally disposed brushes disposed therein, a rod substantially paralleling the rim of said body, said rod having its forward ends bent outwardly to form arms for engaging the cotton plants, the inside of the body concave to receive a liquid for destroying boll worms, etc.

In testimony whereof we have signed our names to this specification.

LEONARD F. REEDER.
WALTER B. JACKSON.